Jan. 28, 1958     G. L. COTTER     2,821,440
FLUID PRESSURE BRAKE APPARATUS WITH MEANS FOR
PREVENTING PREMATURE CUT-OFF OF
QUICK SERVICE ACTIVITY
Filed Oct. 27, 1955
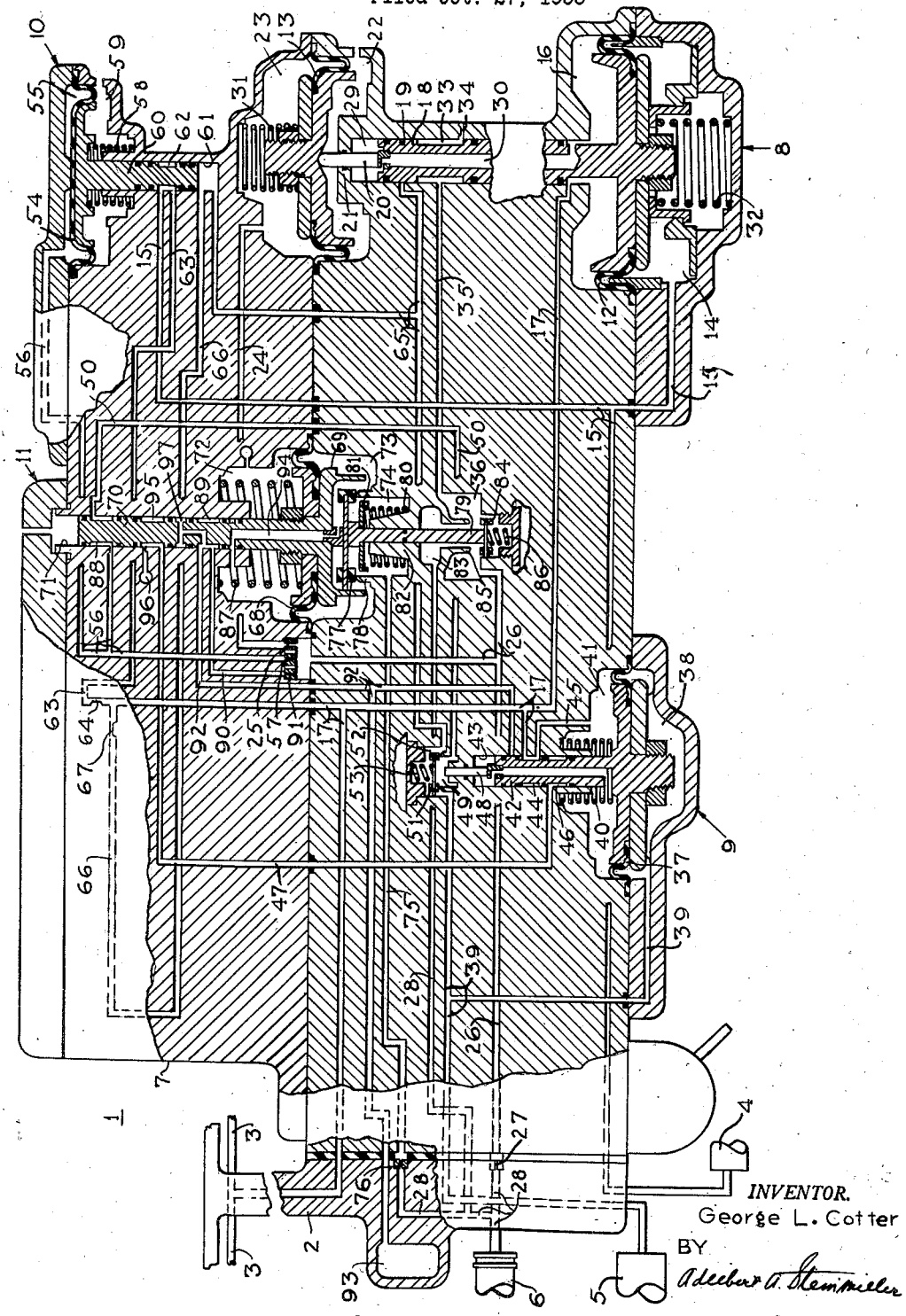
INVENTOR.
George L. Cotter
BY
Adelbert O. Stemmler
ATTORNEY

United States Patent Office 2,821,440
Patented Jan. 28, 1958

2,821,440

FLUID PRESSURE BRAKE APPARATUS WITH MEANS FOR PREVENTING PREMATURE CUT-OFF OF QUICK SERVICE ACTIVITY

George L. Cotter, Pittsburgh, Pa., assignor to Westinghouse Air Brake Company, Wilmerding, Pa., a corporation of Pennsylvania Application October 27, 1955, Serial No. 543,117

5 Claims. (Cl. 303—46)

This invention relates to railway fluid pressure braking apparatus having means for preventing premature cut-off of a quick service reduction in pressure of fluid in a brake pipe and more particularly to means for preventing such premature cut-off in a fluid pressure brake apparatus of the type in which the degree of brake application and release is controlled according to the extent of reduction and restoration, respectively, in brake pipe pressure relative to a datum pressure in a control reservoir.

Where, as in Europe, it is customary to equip only a fraction of the cars of a train with brake apparatus of the above type and to control the brakes on the brake-equipped cars through operator-controlled variations, at the locomotive, in the pressure of fluid in a brake pipe that extends through all the cars of the train, it is desirable to provide on each such brake-equipped car a quick service valve which is capable of responding to a slight (such as .7 p. s. i.) reduction in brake pipe pressure relative to pressure in an auxiliary reservoir by moving to a quick service position, in which the brake pipe is opened to a previously vented quick service volume that is then opened to a restricted quick service reduction communication. The purpose of this restricted communication is to assure that, irrespective of the number of cars without brake apparatus intervening between the particular brake-equipped car and the next rearward brake-equipped car in the train, and in which intervening cars the brake pipe pressure must also be reduced, a quick service reduction in brake pipe pressure will continue, after initial charging of the vented volume, until brake pipe pressure at the particular car has been reduced a selected degree (such as 6 p. s. i.), for thereby causing a corresponding service valve on the particular car to respond to this selected degree of brake pipe pressure reduction by providing in a corresponding brake cylinder fluid at a pressure (of say 10 p. s. i.) corresponding to that for a chosen minimum brake application; said service valve always being operative to provide a brake cylinder pressure which is proportionate to the extent of reduction in brake pipe pressure.

It will thus be apparent that if the rate at which brake pipe pressure is reduced during this so-called continued quick service activity is less than the rate at which auxiliary reservoir pressure is reduced by flow, for example, to the brake cylinder, the quick service valve may move from its quick service position toward or to a normal position and thus prematurely cut off this continued quick service activity by way of the restricted communication before brake pipe pressure has been reduced the aforementioned selected degree; and if this should occur, the service valves on the respective cars will limit the brake cylinder pressure accordingly, and the intended minimum brake application will not be realized, which is, of course, undesirable.

The principal object of this invention is therefore to provide an improved brake apparatus of the above general type embodying novel means for insuring against premature cut-off of continued quick service activity.

Another object is to provide an improved railway car brake apparatus which operates to so control continued quick service activity as to produce a quick service reduction in brake pipe pressure of a selected degree at a given car irrespective of the brake pipe volume in the adjacent rearward cars not equipped with brake apparatus and which brake pipe volume varies according to the number of such adjacent non-equipped cars.

In an apparatus in the above general type it is customary to provide an inshot valve device which is normally in an open position for permitting rapid inshot of auxiliary reservoir air to the brake cylinder for taking up slack in the brake rigging and, in some European countries, applying brakes to a degree corresponding to a chosen minimum brake application; whereupon said inshot valve device moves to a closed position for terminating such rapid inshot to brake cylinder. Accordingly, another object of the invention is to provide an improved arrangement in which operation of the service valve is so interlocked with that of the inshot valve device that after the quick service valve moves to its quick service position, it will be locked in said position until the inshot valve device operates to its closed position.

The foregoing objects may be obtained, in accordance with the present invention, by providing a quick service valve which in normal position connects the brake pipe to a "brake pipe" chamber at one side of the quick service valve diaphragm and blanks off a passage leading to the inshot valve device. When the quick service valve moves to quick service position, it successively disconnects said chamber from the brake pipe and then connects the latter to the quick service volume for effecting a quick service reduction in brake pipe pressure; and at the same time connects said chamber to said passage, which is then opened to atmosphere via the inshot valve device in its open position, for venting said chamber and thereby assuring that the quick service valve will remain in its quick service position so long as the inshot valve device remains in open position. When the inshot valve device moves to its closed position, said passage will be closed off from atmosphere and opened to the quick service volume (which is then opened to the brake pipe via the quick service valve in quick service position) so that brake pipe pressure will be reestablished in said chamber; whereupon the quick service valve will be controlled according to the value of brake pipe pressure relative to the value of opposing auxiliary reservoir pressure in the well-known manner.

Other objects and advantages will become apparent from the following more detailed description of the invention and from the accompanying drawing, wherein the single figure is a diagrammatic view of a portion of a brake apparatus embodying the invention.

Description

As shown in the drawing, the improved brake apparatus comprises a brake controlling valve device 1 which is provided on each brake-equipped car of the train. This valve device 1 comprises a pipe bracket 2, to which are connected the usual brake pipe 3, a control reservoir 4, an auxiliary reservoir 5, and a brake cylinder 6. On one face of the pipe bracket 2 is mounted a sectionalized casing 7 within which are contained a service valve device 8, a quick service valve device 9, a charging valve device 10, and a brake cylinder inshot valve device 11. The charging valve device 10 may be identical in structure and in operation with corresponding valve devices heretofore disclosed; the quick service valve device 9 and inshot valve device 11, however, differ from corresponding valve devices heretofore proposed according to features of the invention hereinafter to be described.

The service valve device 8 may comprise two coaxially arranged, spaced-apart movable abutments, designated generally by the reference numerals 12, 13 and cooperably, though not positively, connected to each other so as to form a stack, as will be understood from subsequent description. The movable abutment 12 is subject at its under side, as viewed in the drawing, to pressure of fluid in a chamber 14 which is constantly open to the control reservoir 4 via a passage 15; and said movable abutment is subject at the opposite side to pressure of fluid in a chamber 16 which is open, except under a condition not pertinent to the present invention, to a passage 17 constantly open to the brake pipe 3.

Coaxially connected to the movable abutment 12 is a cylindrical slide valve 18 having sealing, slidably guided contact with the wall of an aligned bore 19 open to chamber 16. The inner end of valve 18 abuttingly engages a coaxially arranged pusher stem 20 having sealing, slidably guided engagement with the wall of an aligned bore through a casing partition 21 separating the bore 19 from an atmospheric chamber 22 at the lower side of movable abutment 13. At the opposite side of movable abutment 13 is a chamber 23 that is constantly open to the brake cylinder 6 via a passage 24, baffle choke 25, passage 26, brake cylinder application choke 27, and a brake cylinder passage 28. A chamber 29 defined between the inner end of valve 18 and the partition 21 is constantly open to the chamber 16 via a generally axial opening 30 through the slide valve 18 so that opposing pressures on the movable abutment 12 will be effective on equal areas thereof unaffected by the diameter of valve 18.

When brake pipe pressure, as noted in chamber 16, is substantially equal to control reservoir pressure in chamber 14, a helical bias spring 31 in chamber 23 will urge the stack and hence the service slide valve 18 to a normal or release position, in which they are shown, and in which the movable abutment 12 operatively engages, but does not effect compression of a caged helical spring 32 in chamber 14. With service valve 18 in this position, an elongated annular cavity 33 therein connects a brake cylinder release choke 34 with a passage 35 that is constantly open via a chamber 36 in the inshot valve device 11 to a branch of passage 26.

The improved quick service valve device 9 may comprise a movable abutment, designated generally by the reference numeral 37, subject at one side to auxiliary reservoir pressure in a chamber 38 constantly open to the auxiliary reservoir via a passage 39, and subject at the opposite side to pressure of a helical spring 40 and pressure of fluid in a chamber 41. The movable abutment 37 is operatively connected to a coaxially arranged, cylindrical, slide valve 42 that has sealing, slidably guided engagement with the wall of an aligned bore 43 formed in the casing and open to chamber 41.

According to a feature of the invention, when pressure of fluid in chamber 41 is substantially equal to auxiliary reservoir pressure in chamber 38, the spring 40 is effective to bias the quick service valve 42 to a normal position, in which it is shown in the drawing. In this position, an elongated annular cavity 44 formed in valve 42 connects a branch of brake pipe passage 17 to a passage 45 leading to chamber 41; another elongated annular cavity 46 is exposed solely to a passage 47 leading to the inshot valve device 11; and the projecting end of valve 42 engages but exerts no thrust force on, a coaxially arranged pusher stem 48 which intermediate its ends has sealing, slidably guided engagement with the wall of a bore through a casing partition that separates the inner end of bore 43 from a chamber 49 that is constantly open to a passage 50. The pusher stem 48 is adapted to abuttingly engage and thereby unseat a coaxially arranged check valve 51 that controls flow from a chamber 52 constantly open to auxiliary reservoir passage 39 to the chamber 49; said check valve being biased to a closed position by a helical bias spring 53 in said chamber 52 for normally preventing such flow.

The charging valve device 10 may comprise a movable abutment 54 subject at one side to pressure of fluid in a chamber 55 open via a passage 56 and a charging valve blow-down control choke 57 to the passage 26; and subject at the opposite side to pressure of a helical bias spring 58 in an atmospheric chamber 59. The movable abutment 54 is operatively connected to a coaxially arranged, cylindrical slide valve 60 having sealing, slidably guided engagement with the wall of an aligned bore 61 open to chamber 59.

When pressure of fluid in the chamber 55 is below a preselected value, such as about 1 p. s. i., the spring 58 is effective to bias the valve 60 to a charging position, in which it is shown in the drawing. With valve 60 in this position, an elongated annular cavity 62 formed therein connects a branch of control reservoir passage 15 with a control reservoir charging communication which may, for sake of simplified illustration, comprise a passage 63 that is constantly open to a branch of brake pipe passage 17 via a control reservoir charging choke 64; and also the projecting end of valve 60 is so disposed as to uncover to a passage 65 leading to chamber 52 of quick service valve device 9 an auxiliary reservoir charging communication which, for sake of illustration, may comprise a passage 66 constantly open to a branch of brake pipe passage 17 via an auxiliary reservoir charging choke 67.

The inshot valve device 11 may comprise a flexible diaphragm 68 suitably clamped about its outer edge between sections of the casing and operatively connected through the medium of a diaphragm follower assemblage 69 to a cylindrical slide valve 70 that has sealing, slidably guided engagement with the wall of an aligned bore 71 formed in the casing and open to an atmospheric chamber 72 at one side of said diaphragm. At the opposite side of diaphragm 68 is a chamber 73 which, under a condition hereinafter to be described, is opened to a chamber 74 that is constantly open via a passage 75 and the usual inshot baffle choke 76 to a branch of brake cylinder passage 28.

For controlling fluid pressure communication between the chambers 73 and 74, there is provided a preferably disc-shaped valve 77 that is adapted to seat against an annular valve seat rib 78 encircling the chamber 74. An actuating stem 79 is held in abutting engagement with the lower face of valve 77, as viewed in the drawing, through the medium of a helical spring 80, which is disposed in the chamber 74 and acts on an annular spring seat 81 carried by said stem. Intermediate its ends the stem 79 has sealing, slidably guided engagement with the wall of an aligned bore through a casing partition 82 separating the chamber 74 from a chamber 83 that is constantly open to a branch of brake cylinder passage 28. At its lower end the stem 79 is adapted to engage and unseat a coaxially arranged, preferably disc-shaped inshot valve 84 from an annular valve seat rib 85 encircling chamber 83. The inshot valve 84 controls communication between the chambers 36 and 83 and is biased to a closed position by a helical spring 86 in chamber 36.

A helical regulating spring 87 in the atmospheric chamber 72 acts on follower assemblage 69 for causing the latter to engage the upper side, as viewed in the drawing, of valve 77 for normally holding said valve seated and, through the medium of said valve and the stem 79, holding the inshot valve 84 unseated against resistance of spring 86, as shown in the drawing. Under this condition, the inshot slide valve 70, which is carried by follower assemblage 69, will be disposed in a normal or open position, in which it is shown in the drawing. With valve 70 in this position, an elongated annular cavity 88 therein connects passage 50 with a branch of passage 56; an elongated annular cavity 89 formed in valve 70 connects a passage 90, that is open via the usual continued quick service reduction choke 91 to a branch of passage 26, with a passage 92 leading to a quick service volume 93 and to the quick service valve bore 43; and a suitable restricted passageway 94 in valve 70 connects the atmospheric chamber 72 with chamber 73 for opening the latter to atmosphere.

According to a feature of the invention, the inshot slide valve 70 also has an elongated annular cavity 95, which in normal position of said valve, connects passage 47 to an atmospheric vent port 96; and said valve also has an annular cavity 97, intermediate the cavities 95 and 89, which is constantly open to the latter cavity and, in normal position of said valve, is exposed solely to the valve bore 71, for reasons hereinafter to be described.

*Operation*

Assume initially that the brake pipe 3 is charged with fluid at the normal operating value of brake pipe pressure. In consequence thereof, brake pipe pressure in chamber 16 and the pressure of spring 31 in chamber 23, acting on the movable abutment stack of service valve device 8 in opposition to control reservoir pressure in chamber 14, will cause the service valve 18 to be maintained in its previously defined release position, in which the brake cylinder 6 is opened to atmosphere via passage 28, choke 27, passage 26, chamber 36, passage 35, service valve cavity 33, and brake cylinder release choke 34. With the brake cylinder 6 and hence chamber 74 of inshot valve device 11 vented, the inshot valve 84 will be unseated and the inshot slide valve 70 will be in its previously defined normal position, in which the passage 50 and quick service volume 93 are opened to the vented brake cylinder by way of valve cavities 88, 89 and chokes 57, 91, respectively. With the brake cylinder 6 and passage 50 thus vented, chamber 55 of charging valve device 10 will also be vented via passage 56 and choke 57, and consequently the charging valve 60 will be in its previously defined charging position, in which the control reservoir 4 and auxiliary reservoir 5 are opened to the brake pipe 3 via previously described communications, with the result that said reservoirs will be charged to the normal operating value of brake pipe pressure.

It is to be noted that prior to initial charging, the pressure of spring 40 will operatively maintain the quick service valve 42 in its normal position, in which brake pipe passage 17 is opened to chamber 41 via valve cavity 44; and since, during initial charging, brake pipe pressure will increase at a faster rate than auxiliary reservoir pressure, brake pipe air will be supplied via the communication just described to chamber 41 and maintain quick service valve 42 in its normal position throughout initial charging. With quick service valve 42 in normal position, valve cavity 46 will be exposed solely to the passage 47, which is then vented to atmosphere via cavity 95 of the inshot valve 70 in its normal position; and passage 92 and quick service volume 93 will be disconnected from the brake pipe passage 17; and check valve 51 will be seated for preventing flow from auxiliary reservoir passage 39 to passage 50.

Assume now that it is desired to effect a minimum application of brakes throughout the train. To this end, brake pipe pressure is reduced at the locomotive an extent sufficient to effect on the first brake-equipped car a reduction in brake pipe pressure of a chosen slight degree, such as .7 p. s. i. This reduction in brake pipe pressure will be noted in chamber 41 of quick service valve device 9 on the nearest brake-equipped car via brake pipe passage 17 and cavity 44 of the quick service valve 42 in normal position, with the result that auxiliary reservoir pressure in chamber 38 will shift the movable abutment 37 against resistance of reduced brake pipe pressure in chamber 41 and pressure of spring 40 for causing the quick service valve 42 to be shifted to a quick service position. During movement of valve 42 to this position, cavity 44 will successively disconnect chamber 41 from brake pipe passage 17 and then connect the latter to passage 92 and quick service volume 93 for effecting a relatively rapid local quick service reduction in brake pipe pressure until said volume is charged; whereupon brake pipe pressure will continue to be reduced by flow through cavity 89 of the inshot slide valve 70 in normal position and via choke 91 to the brake cylinder 6 at the restricted rate controlled by said choke.

Also during movement of quick service valve 42 to its quick service position, valve cavity 46 will connect chamber 41 to passage 47 for thereby venting chamber 41 via passage 47, valve cavity 95 of the inshot slide valve 70 in normal position, and the atmospheric vent port 96. With chamber 41 thus vented, the quick service valve 42 will be positively maintained in its quick service position. Meanwhile, during movement of valve 42 to its quick service position, it will operatively unseat the check valve 51 against resistance of bias spring 53 through the medium of the pusher stem 48, for permitting fluid under pressure to flow from the auxiliary reservoir passage 39 past the unseated check valve 51 to chamber 49 and thence via passage 50, cavity 88 of inshot valve 70 in normal position, and passage 56 to chamber 55 of the charging valve device 10; it being noted that choke 57 restricts the rate of release of such fluid from chamber 55 into the brake cylinder 6.

Pressure of fluid thus supplied to chamber 55 will shift the movable abutment 54 against resistance of the light bias spring 58 for carrying the charging valve 60 to a cut-off position, in which cavity 62 disconnects passage 63 from control reservoir passage 15 and the valve 60 laps passage 66, for thereby closing off the brake pipe from the control reservoir 4 and auxiliary reservoir 5, respectively.

Meanwhile, in the service valve device 8, when brake pipe pressure in chamber 16 has been reduced a chosen degree, such as about 3 p. s. i., below control reservoir pressure in chamber 14, as determined by the selected value of spring 31, the movable abutment stack will be shifted upwardly by preponderant control reservoir pressure and thereby carry the service valve 18 to an application position, in which valve cavity 33 disconnects passage 35 from choke 34 and connects said passage 35 to a branch of passage 65. Under this condition, fluid under pressure will flow from the auxiliary reservoir 5 via passage 39, chamber 52 in quick service valve device 9, passage 65, service valve cavity 33, and passage 35, to chamber 36, and thence past the unseated inshot valve 84 to chamber 83 and thence directly to the brake cylinder passage 28 at a relatively rapid rate for rapidly taking up slack in the brake rigging; it being noted that some of such fluid will also be supplied to said brake cylinder via a restricted communication including chamber 36, passage 26, brake cylinder application choke 27 and passage 28 at the rate controlled by said choke.

Some of the fluid under pressure thus supplied to the brake cylinder 6 will be supplied to chamber 23 of the service valve device 8 via passages 26 and 24; and when brake cylinder pressure in said chamber has increased to an extent corresponding to the degree of reduction in brake pipe pressure, as noted in chamber 16, the movable abutment stack will be shifted in the direction of chamber 14 for carrying the service valve 18 to a lap position, in which the cavity 33 disconnects passage 35 from both passage 65 and release choke 34 for thereby bottling up fluid in the brake cylinder at the desired pressure corresponding to such reduction in brake pipe pressure.

Meanwhile, when brake cylinder pressure has increased to a chosen value, such as about 10 p. s. i., as determined by the fluid pressure necessary in chamber 74 to unseat valve 77 against resistance of spring 87, the valve 77 will snap open and cause the inshot slide valve 70 to be shifted to an upper or closed position and at the same time admit brake cylinder air to the under side of the diaphragm 68. With valve 70 in this position, restricted passageway 94 is disconnected from atmospheric chamber 72 for permitting pressure in chamber 73 to equalize with brake cylinder pressure; the quick service volume 93 is disconnected from the continued quick service reduction choke 91 and brake cylinder 6 for terminating the quick service reduction in brake pipe pressure; supply of auxiliary reservoir air from passage 50 to the charging valve chamber 55 is cut off, but said chamber will thereafter be maintained charged by brake cylinder pressure bleeding back through the choke 57 from the now charged brake cylinder 6; passage 47 is cut off from the atmospheric vent port 96; and valve cavities 97 and 89 connect the passage 92 to the passage 47 for permitting brake pipe air to flow to quick service valve chamber 41 via brake pipe passage 17, quick service valve cavity 44, passage 92, inshot slide valve cavities 89, 97, passage 47, quick service valve cavity 46 and passage 45, so that the quick service valve 42 will return to its normal position when brake pipe pressure is substantially equal to auxiliary reservoir pressure, as with quick service valve devices heretofore proposed.

Also, with inshot slide valve 70 in its closed position, the actuating stem 79 will be urged upwardly by spring 80, thereby permitting the inshot valve 84 to be seated against seat rib 85 by pressure of spring 86. With inshot valve 84 thus seated, chamber 36 will be cut off from chamber 83 for thereby terminating the rapid charging of the brake cylinder 6; whereupon subsequent supply of auxiliary reservoir air to the brake cylinder will be via, and at the restricted rate controlled by, the brake cylinder application choke 27 in the previously defined restricted communication.

It will thus be noted that, according to the invention, when the quick service valve 42 is shifted from its normal position to its quick service position responsively to the illustrative .7 p. s. i. reduction in brake pipe pressure, the chamber 41 will be successively cut off from the brake pipe passage 17 and then vented via passage 47 and cavity 95 of the inshot slide valve 70 in normal position for preventing operation of the quick service valve to its normal position until the inshot slide valve 70 moves to its closed position; and hence quick service activity will continue until a brake cylinder pressure, illustratively assumed as 10 p. s. i. and corresponding to the desired degree of minimum brake application, has been effected. In other words, the desired minimum application of brakes will be effected throughout the train, even if auxiliary reservoir pressure should reduce (as by flow to the brake cylinder 6) to the value of brake pipe pressure, as may occur when, as illustratively assumed, the operator effects a .7 p. s. i. reduction in brake pipe pressure at the locomotive and relies upon continued quick service activity to reduce brake pipe pressure in the "dead" brake pipe volume on a large number of adjacent unbraked cars at the restricted rate determined by the continued quick service reduction choke 91. Thus the chamber 41 will be maintained vented in this manner for holding the quick service valve 42 in quick service position until the inshot slide valve 70 moves to its closed position; whereupon chamber 41 will be recharged from the brake pipe passage 17 by flow via quick service valve cavity 44, passage 92, inshot slide valve cavities 89, 95, passage 47, quick service valve cavity 46 and passage 45 for permitting operation of the quick service valve to thereupon be controlled according to the value of brake pipe pressure relative to opposing auxiliary reservoir pressure.

When brake pipe pressure and hence pressure in chamber 16 is increased for releasing brakes, the service slide valve 18 will be shifted to its release position, for releasing brake cylinder air via passage 35 at the rate controlled by the brake cylinder release choke 34. The quick service valve 42 will be returned to its normal position when brake pipe pressure in chamber 41 has increased sufficiently relative to auxiliary reservoir pressure in chamber 38.

When brake cylinder pressure has reduced to a preselected low value, such as about 5 p. s. i., as determined by the pressure of spring 87 relative to the opposing brake cylinder pressure in chamber 73, the inshot slide valve 70 will be shifted to its normal or lower position for reestablishing the communications described in connection with initial charging, and the inshot valve 84 will be unseated. Fluid pressure in charging valve chamber 55 will blow down into the brake cylinder at the rate controlled by the blowdown control choke 57 and cause the charging valve 60 to be shifted to its charging position by spring 58 when pressure in said chamber has thus been reduced to substantially atmospheric.

Following this complete release of brakes, all components will once again be in the respective positions in which they are shown in the drawing.

*Summary*

It will now be seen that the improved brake apparatus embodies a novel arrangement whereby the quick service valve 42, in moving from normal position to quick service position, cuts off chamber 41 from the brake pipe and opens said chamber to a vent communication (47, 95, 96) that is maintained open to atmosphere so long as the inshot slide valve 70 is in its normal or open position, for assuring that the continued quick service reduction in brake pipe pressure will continue until brake cylinder pressure has attained a preselected value, such as about 10 p. s. i., corresponding to a chosen minimum brake application; whereupon the inshot slide valve will be shifted by such brake cylinder pressure to a closed position for closing the vent communication and reopening the chamber 41 to the brake pipe.

Having now described the invention, what I claim as new and desire to secure by Letters Patent, is:

1. A fluid pressure brake apparatus comprising, in combination, a brake pipe normally charged with fluid under pressure, a brake cylinder, a quick service communication through which fluid under pressure may be released from said brake pipe to said brake cylinder, means defining a chamber, another communication independent of said quick service communication through which fluid under pressure may be released from said chamber to atmosphere, an auxiliary reservoir, quick service effecting means subject to auxiliary reservoir in opposition to fluid pressure in said chamber and a spring bias, said quick service effecting means normally being urged by its spring bias to a normal position for opening said chamber to said brake pipe and responsive to a reduction in pressure in said chamber resulting from a slight reduction in brake pipe pressure below auxiliary reservoir pressure to move to a quick service position for closing off said brake pipe from said chamber and opening the latter to said other communication while also opening said brake pipe to said quick service communication for effecting a quick service reduction in brake pipe pressure, service valve means responsive to a chosen reduction in brake pipe pressure below normal full charge value, greater than that corresponding to said slight reduction, to supply fluid under pressure from said auxiliary reservoir to said brake cylinder, and other means responsive to fluid pressure in said brake cylinder in excess of a predetermined value to close off said quick service communication from said brake cylinder and also close off said other communication from atmosphere.

2. A fluid pressure brake apparatus comprising, in combination, a normally charged brake pipe, a brake cylinder, a quick service volume normally open to the brake cylinder, means defining a chamber that is normally open to the brake pipe, a passage normally open to atmosphere, quick service valve means subject to fluid pressure in said chamber and an opposing pressure and responsive to a reduction in fluid pressure in said chamber resulting from an initial slight reduction in brake pipe pressure below normal charge value, to move to a quick service position for closing off said chamber from said brake pipe and opening the latter to said quick service volume for causing a local withdrawal of fluid under pressure from the brake pipe while also connecting said chamber to said passage for releasing fluid under pressure from said chamber, and means controlled by brake cylinder pressure and responsive to brake cylinder pressure in excess of a predetermined value to close off said quick service volume from the brake cylinder and close off said passage from atmosphere and also connect said quick service volume to said passage for causing pressure in said chamber to be reestablished at the value of brake pipe pressure.

3. A fluid pressure apparatus comprising, in combination, a brake pipe normally charged with fluid under pressure, a brake cylinder, a quick service volume independent of said brake cylinder, a normally open restricted communication connecting said quick service volume with said brake cylinder, means defining a chamber, a passage through which fluid under pressure may be released from said chamber at a substantially unrestricted rate for reducing pressure in said chamber to a value substantially below brake pipe pressure, quick service effecting means subject to fluid pressure in said chamber and an opposing fluid pressure and normally positioned to open said chamber to said brake pipe and responsive to a reduction in pressure in said chamber resulting from an initial slight reduction in brake pipe pressure below normal full charge value to move to a quick service position for closing off said brake pipe from said chamber and opening the latter to said passage while also opening said brake pipe to said quick service volume for effecting a quick service reduction in brake pipe pressure, a control reservoir, service valve means responsive to a reduction in brake pipe pressure below control reservoir pressure of a chosen degree, greater than that corresponding to said slight reduction, to supply fluid under pressure to said brake cylinder, means defining a control chamber, flow restricting means interposed between said control chamber and brake cylinder, charging valve means for selectively establishing or disestablishing connection between said control reservoir and brake pipe according to whether pressure in said control chamber is less than or greater than a chosen small value, said quick service effecting means being operative in its quick service position to supply fluid under pressure to said control chamber in by-pass of said flow restricting means from a source other than said quick service volume, and means controlled by brake cylinder pressure and responsive to brake cylinder pressure in excess of a selected value to effect closure of said restricted communication and open said quick service volume to said passage and also terminate supply of fluid under pressure to said control chamber from said quick service effecting means.

4. A fluid pressure brake apparatus comprising, in combination, a brake pipe normally charged with fluid under pressure, a quick service communication through which fluid under pressure may be released from said brake pipe, means defining a chamber, another communication independent of said quick service communication through which fluid under pressure may be released from said chamber for reducing pressure in said chamber to a value substantially below brake pipe pressure, quick service effecting means subject to fluid pressure in said chamber and an opposing fluid pressure and normally positioned to open said chamber to said brake pipe and responsive to a reduction in pressure in said chamber resulting from an initial slight reduction in brake pipe pressure below normal full charge value to move to a quick service position for closing off said brake pipe from said chamber and opening the latter to said other communication while also opening said brake pipe to said quick service communication for effecting a quick service reduction in brake pipe pressure, a brake controlling communication to which fluid under pressure is supplied responsively to a reduction in brake pipe pressure for causing an application of brakes, and means controlled according to pressure of fluid in the brake controlling communication and responsive to a fluid pressure in excess of a predetermined value therein to effect termination of the quick service reduction in brake pipe pressure via said quick service communication and also effect termination of release of fluid under pressure from said chamber via said other communication and also connect said quick service communication with said other communication for causing said chamber to be recharged to equality with brake pipe pressure via said quick service effecting means in quick service position.

5. A fluid pressure brake apparatus comprising, in combination, a brake pipe normally charged with fluid under pressure, a brake cylinder, a quick service communication through which fluid under pressure may be released from said brake pipe to said brake cylinder, means defining a chamber, another communication independent of said quick service communication through which fluid under pressure may be released from said chamber to atmosphere, an auxiliary reservoir, quick service effecting means subject to auxiliary reservoir in opposition to fluid pressure in said chamber and a spring bias, said quick service effecting means being urged by its spring bias to a normal position for opening said chamber to said brake pipe and responsive to a reduction in pressure in said chamber resulting from a slight reduction in brake pipe pressure below auxiliary reservoir pressure to move to a quick service position for closing off said brake pipe from said chamber and opening the latter to said other communication while also opening said brake pipe to said quick service communication for effecting a quick service reduction in brake pipe pressure, a restricted communication and a substantially unrestricted communication both of which are arranged in parallel and lead from the service valve means to the brake cylinder, service valve means responsive to a chosen reduction in brake pipe pressure below normal full charge value, greater than that corresponding to said slight reduction, to supply fluid under pressure from said auxiliary reservoir to said brake cylinder via both said restricted communication and said unrestricted communication, and other means responsive to fluid pressure in said brake cylinder in excess of a predetermined value to close off said quick service communication from said brake cylinder and also close off said other communication from atmosphere and also effect closure of said unrestricted communication.

References Cited in the file of this patent

UNITED STATES PATENTS

| | | |
|---|---|---|
| 1,935,808 | McCune | Nov. 21, 1933 |
| 2,068,343 | McCune | Jan. 19, 1937 |